(12) United States Patent
Mizuno et al.

(10) Patent No.: US 7,493,756 B2
(45) Date of Patent: Feb. 24, 2009

(54) INTERNAL COMBUSTION ENGINE WITH TORQUE CONVERTER

(75) Inventors: Kinya Mizuno, Saitama (JP); Seiji Hamaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 113 days.

(21) Appl. No.: 11/435,935

(22) Filed: May 18, 2006

(65) Prior Publication Data

US 2006/0272609 A1 Dec. 7, 2006

(30) Foreign Application Priority Data

May 20, 2005 (JP) ............................. 2005-148075

(51) Int. Cl.
*F16D 33/00* (2006.01)
(52) U.S. Cl. .......................................... 60/339
(58) Field of Classification Search .................. 60/330, 60/339
See application file for complete search history.

(56) References Cited

U.S. PATENT DOCUMENTS 6,386,067 B1 * 5/2002 Inoue et al. ................. 74/730.1
6,484,854 B2 * 11/2002 Yoshimoto et al. ............. 60/345
6,793,052 B2 * 9/2004 Imasaka et al. ............... 60/339
6,925,798 B2 * 8/2005 Hori et al. ...................... 60/336

FOREIGN PATENT DOCUMENTS

JP 2003-328717 A 11/2003

* cited by examiner

*Primary Examiner*—Michael Leslie
(74) *Attorney, Agent, or Firm*—Birch, Stewart, Kolasch & Birch, LLP

(57) ABSTRACT

An internal combustion engine with a torque converter for extending the temperature range of a hydraulic fluid allowing the function of the torque converter toward lower temperatures. A crankshaft is formed with an oil passage extending there along, an inlet hole for supplying a hydraulic fluid to the torque converter and an outlet hole for discharging the hydraulic fluid. The crankshaft includes a shaft bearing for supporting a rotating shaft for the torque converter. The inlet hole is provided at an axial end of the shaft bearing and contacts the shaft bearing. Flow resistance due to the shaft bearing can be greatly reduced to thereby allow a smooth supply of the hydraulic fluid into the torque converter. When the temperature of the hydraulic fluid is low and the viscosity of the hydraulic fluid is high, a quantity of oil at a certain pressure can be supplied to the torque converter.

13 Claims, 3 Drawing Sheets

INTERNAL COMBUSTION ENGINE WITH TORQUE CONVERTER

CROSS-REFERENCE TO RELATED APPLICATIONS

The present application claims priority under 35 USC 119 to Japanese Patent Application No. 2005-148075 filed on May 20, 2005 the entire contents of which are hereby incorporated by reference.

FIELD OF THE INVENTION

The present invention relates to an internal combustion engine with a torque converter. More particularly, to an internal combustion engine with a torque converter which can extend the temperature range of a hydraulic fluid to permit the torque converter to function at lower temperatures.

DESCRIPTION OF BACKGROUND ART

An internal combustion engine with a torque converter is known that uses a common oil as a hydraulic fluid for the torque converter and a lubricating oil for the internal combustion engine. In the situation where the hydraulic fluid returned from the torque converter in such an internal combustion engine is not discharged into the oil stored in an oil pan, but is directly discharged into a crankcase, the hydraulic fluid returned becomes a mist at a discharge opening, causing a possible reduction in oil circulation efficiency. However, in the situation where an oil passage for the returned hydraulic fluid that is independent of an oil passage for the lubricating oil is formed to discharge the returned hydraulic fluid into the oil stored in the oil pan, the oil passage for the returned hydraulic fluid becomes complicated in structure, causing an increase in number of production steps.

Japanese Patent Laid-Open No. 2003-328717 discloses an internal combustion engine with a torque converter having an oil passage for the hydraulic fluid returned from the torque converter, wherein this oil passage communicates with an oil passage formed along the axis of a crankshaft. A chamber is formed by an oil seal for sealing a shaft bearing provided on the crankshaft. An oil passage is provided that passes through a crankcase and is provided with a check valve at an outlet end. With this configuration, the hydraulic fluid returned from the torque converter can be discharged into the oil stored in the oil pan by a simple change in structure. FIG. 5 illustrates such a prior art configuration, wherein an inlet hole 35a and an outlet hole 36 are formed in a shaft portion 31 of a crankshaft 50. A hydraulic fluid is supplied through the inlet hole 35a into a torque converter 60 and discharged from the torque converter 60 through the outlet hole 36. The crankshaft 50 is provided with a needle shaft bearing 55 for supporting a rotating shaft for the torque converter 60. The inlet hole 35a is located at the axial center of the needle shaft bearing 55. Accordingly, the oil (hydraulic fluid) introduced from the inlet hole 35a is passed through a space between needle rollers and inner and outer rings of the needle shaft bearing 55, and is next supplied to a passage 48.

However, the internal combustion engine with the torque converter disclosed in Japanese Patent Laid-Open No. 2003-328717 has a problem such that when the temperature of the hydraulic fluid for the torque converter is lower than a normal temperature during cold starting or the like and the viscosity of the hydraulic fluid is therefore high, there is a possibility that the hydraulic fluid in the torque converter may not reach a sufficient oil quantity and oil pressure. Thus, a necessary drive force cannot be obtained until the temperature of the hydraulic fluid rises to a certain temperature. This problem is due to the fact that a flow resistance in the vicinity of the inlet hole 35a is increased by an increase in viscosity of the hydraulic fluid, so that the hydraulic fluid is not smoothly supplied into the torque converter.

SUMMARY AND OBJECTS OF THE INVENTION

It is accordingly an object of an embodiment of the present invention to provide an internal combustion engine with a torque converter which can extend the temperature range of a hydraulic fluid allowing the the torque converter to function at lower temperatures.

In accordance with an embodiment of the present invention, there is provided an internal combustion engine with a torque converter mounted on a crankshaft with the crankshaft being formed with an oil passage extending along the axis of the crankshaft. An inlet hole is provided for supplying a hydraulic fluid from the oil passage to the torque converter. An outlet hole is provided for discharging the hydraulic fluid from the torque converter to the oil passage. The crankshaft includes an orifice provided in the oil passage with the inlet hole being located upstream of the orifice and the outlet hole being located downstream of the orifice. The crankshaft is provided with a shaft bearing for supporting a rotating shaft for the torque converter with the shaft bearing being lubricated by the hydraulic fluid in the vicinity of the inlet hole. The inlet hole is located so as to be shifted from the axial center of the shaft bearing.

In an embodiment of the present invention, the inlet hole is located at an axial end of the shaft bearing.

In an embodiment of the present invention, the axial end of the shaft bearing corresponds to an axial end positioned near the rotating shaft for the torque converter.

In an embodiment of the present invention, the inlet hole is located so that at least a part of an opening of the inlet hole exposed to the shaft bearing is not blocked by the shaft bearing.

In an embodiment of the present invention, the inlet hole is located in the vicinity of the axial center of the rotating shaft for the torque converter.

According to an embodiment of the present invention, the inlet hole is located at the axial end of the shaft bearing shifted from the axial center thereof. Accordingly, a flow resistance in an oil passage connecting the inlet hole to the torque converter can be greatly reduced by a simple change in structure, so that the temperature range of the hydraulic fluid allowing the torque converter can be extended to function at lower temperatures.

According to an embodiment of the present invention, the axial end of the shaft bearing corresponds to an axial end positioned near the rotating shaft for the torque converter. Accordingly, the inlet hole is located near the axial center of the torque converter, so that the hydraulic fluid can be supplied more smoothly into the torque converter.

According to an embodiment of the present invention, the inlet hole is located so that at least a part of an opening of the inlet hole exposed to the shaft bearing is not blocked by the shaft bearing. Accordingly, a flow resistance at the opening of the inlet hole can be greatly reduced.

According to an embodiment of the present invention, the inlet hole is located in the vicinity of the axial center of the rotating shaft for the torque converter. Accordingly, the hydraulic fluid can be supplied more smoothly into the torque converter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
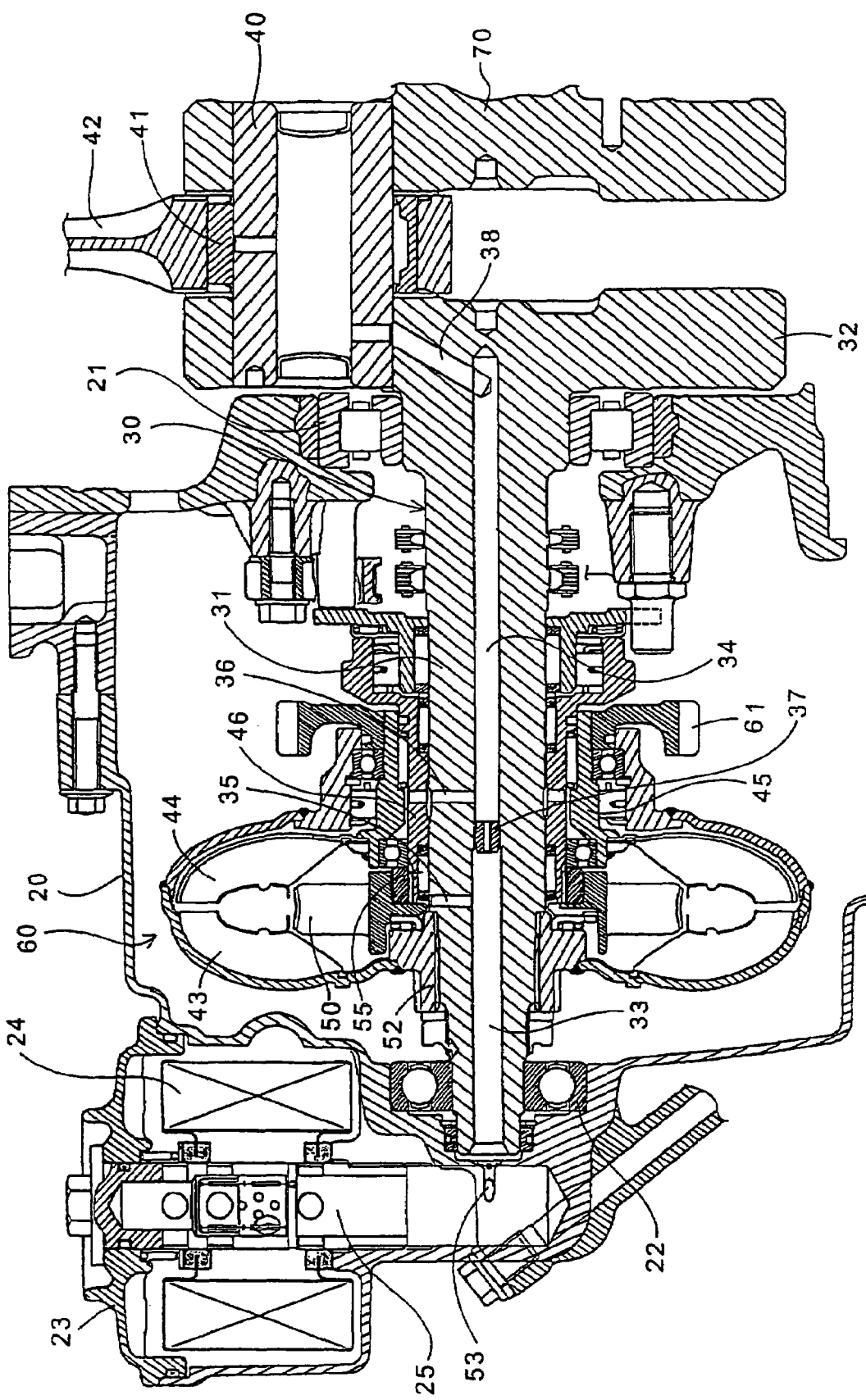
FIG. 1 is a sectional view of an internal combustion engine according to a preferred embodiment of the present invention.

A preferred embodiment of the present invention will now be described in detail with reference to the drawings. FIG. 1 is a sectional view of a main part of an internal combustion engine with a torque converter according to the present invention. The internal combustion engine 10 is a four-cycle, single-cylinder engine such that a piston (not shown) is pushed by the explosion pressure of an air-fuel mixture to generate a rotational drive force from a crankshaft 30 and to transmit the rotational drive force to a transmission (not shown) through the torque converter 60 coaxially provided on the crankshaft 30. The crankshaft 30 is rotatably supported through shaft bearings 21 and 22 to a crankcase 20. The crankshaft 30 is composed of a shaft portion 31 and a substantially disk-shaped crank web 32. A crankpin 40 for connecting the crankshaft 30 and another crankshaft 70 forming a pair in combination with the crankshaft 30 is engaged with the crank web 32. A shaft bearing 41 is engaged with the crankpin 40, and a larger end of a connecting rod 42 is rotatably supported to the shaft bearing 41. With this configuration, the reciprocating motion of the piston mounted at a smaller end of the connecting rod 42 in the vertical direction as viewed in FIG. 1 is converted into the rotational motion of the crankshafts 30 and 70.

The rotational drive force generated from the crankshaft 30 is transmitted through the torque converter 60 as a known torque converting device to the transmission for taking out the rotational drive force at an arbitrary reduction gear ratio. The torque converter 60 is composed of a pump impeller 43, a turbine runner 44, and a stator 50. The pump impeller 43 is connected to a support member 52 splined to the crankshaft 30. When the internal combustion engine 10 is started to start rotating the crankshaft 30, the oil (hydraulic fluid) fed under pressure from an oil pump (not shown) is supplied into the torque converter 60. With an increase in rotational speed of the pump impeller 43 rotating integrally with the crankshaft 30, the turbine runner 44 starts rotating so as to follow the rotation of the pump impeller 43 with the aid of the viscosity of the hydraulic fluid. The rotational drive force generated from the turbine runner 44 is next transmitted to the transmission through an output gear 61 connected to a transmitting ring 45.

The internal combustion engine 10 uses a common oil as the hydraulic fluid for the torque converter 60 and the lubricating oil for various parts to be lubricated. A substantially cylindrical oil filter 24 is fixed and sealed through a cover 23 to one end portion of the crankcase 20. The oil fed under pressure from the oil pump is passed through the oil filter 24 to an oil passage 25 and introduced from the oil passage 25 to an oil inlet 53 located at the left end of the crankcase 30 as viewed in FIG. 1. The oil introduced from the oil inlet 53 flows into an oil gallery 33 formed along the axis of the shaft portion 31, and is then introduced to the torque converter 60 through an inlet hole 35 radially extending from the oil gallery 33 to the outer circumference of the shaft portion 31. The oil having operated as the hydraulic fluid in the torque converter 60 is discharged from an outlet hole 36 radially extending like the inlet hole 35 to another oil gallery 34 formed along the axis of the shaft portion 31. The oil flowing in the oil gallery 34 toward the crank web 32 is introduced through another oil gallery 38 formed in the crank web 32 to the outer circumference of the crankpin 40, so that this oil is used for lubrication of the shaft bearing 41 and for the cooling of the piston. The remaining oil not used for the lubrication and cooling mentioned above is returned through an oil passage (not shown) communicating with the oil gallery 34 to an oil pan (not shown) of the crankcase 20. An oil flow control member 37 forming a bypass oil passage bypassing the torque converter 60 is provided between the oil gallery 33 communicating with the inlet hole 35 and the oil gallery 34 communicating with the outlet hole 36. The oil flow control member 37 is a pipelike orifice for reducing the diameter of an oil passage where the orifice is located to thereby control an oil flow rate in the oil passage. The inlet hole 35 is located upstream of the oil flow control member 37 with respect to the oil flow in the oil passage formed along the axis of the shaft portion 31. Accordingly, the oil fed from the oil pump is introduced to the inlet hole 35, i.e., to the torque converter 60 more preferentially than to the oil flow control member 37. The shaft portion 31 is supported in the vicinity of the inlet hole 35 by a shaft bearing 55 supported to a shaft support member 46.

Figure 2:
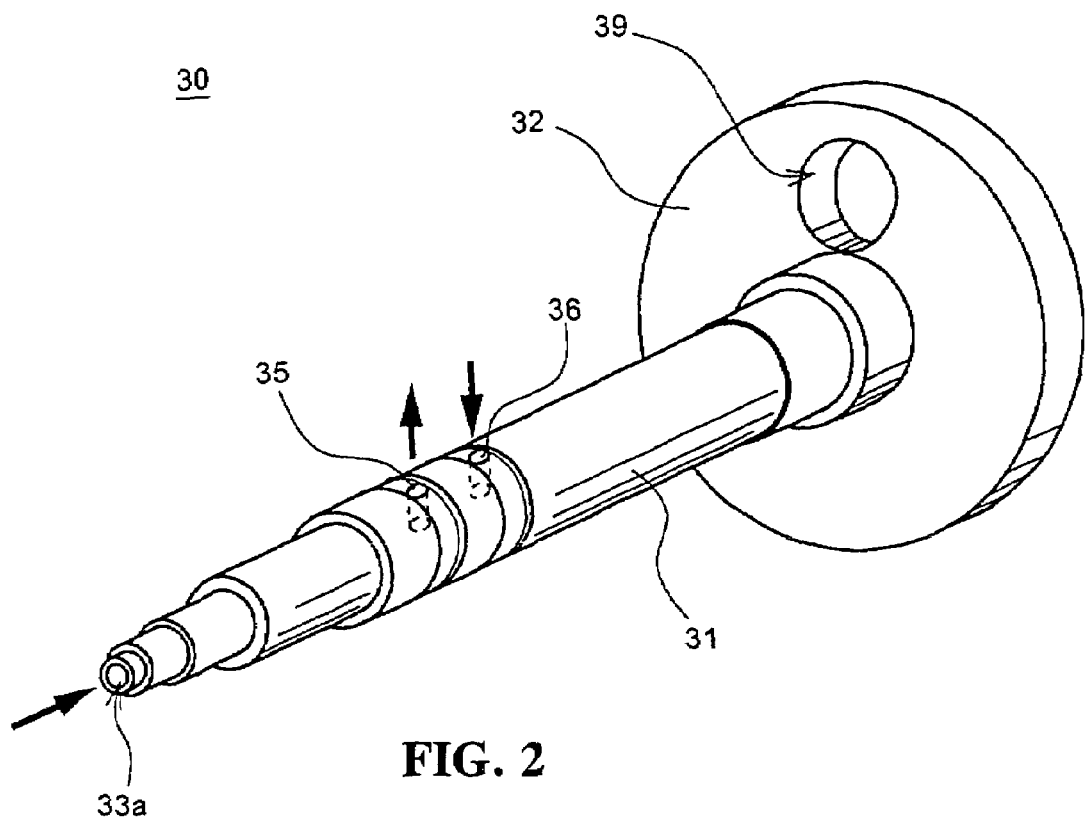
FIG. 2 is a schematic perspective view of a crankshaft in the internal combustion engine shown in FIG. 1.

FIG. 2 is a schematic perspective view of the crankshaft 30. As mentioned above, the oil introduced from an oil inlet 33a formed at one end of the shaft portion 31 is supplied through the inlet hole 35 into the torque converter 60 (see FIG. 1). Thereafter, the oil is discharged from the outlet hole 36 and then supplied to a crankpin hole 39 wherein the crankpin 40 (see FIG. 1) is fitted, so as to lubricate the shaft bearing 41 (see FIG. 1), for example. In an embodiment of the present invention, the inlet hole 35 and the outlet hole 36 have the same diameter (e.g., 3 mm).

Figure 3:
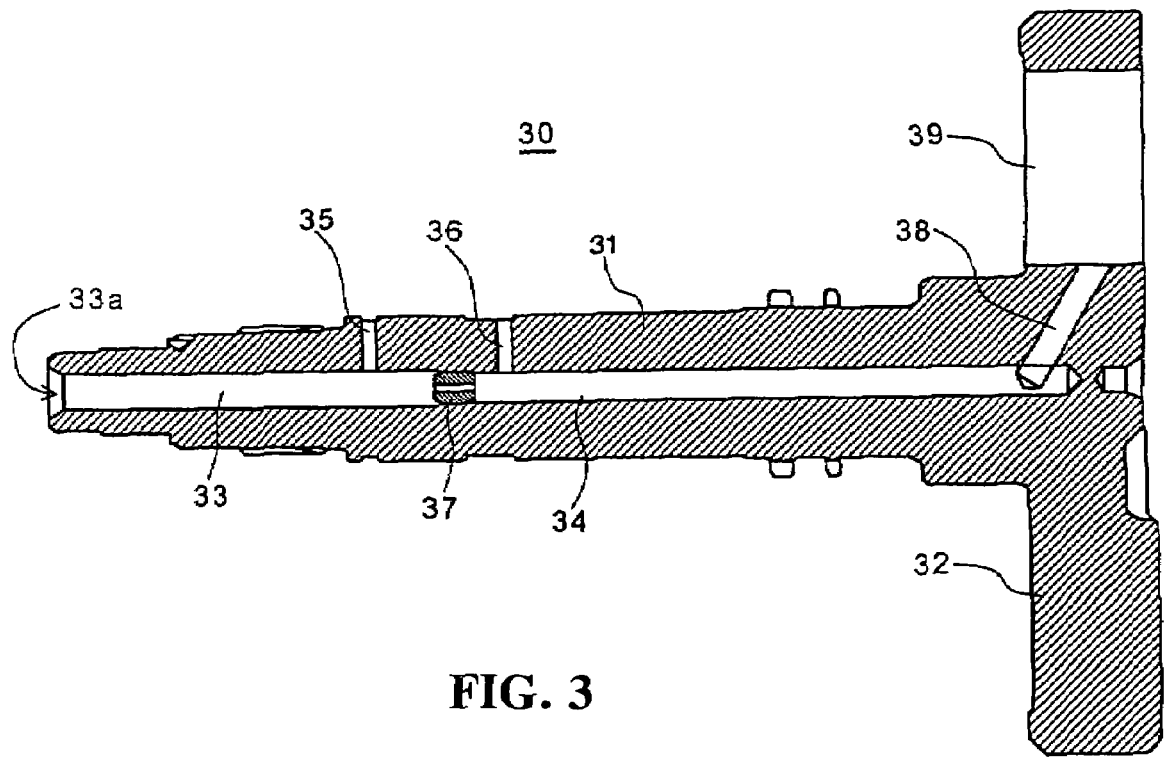
FIG. 3 is a sectional view of the crankshaft shown in FIG. 2.
Figure 4:
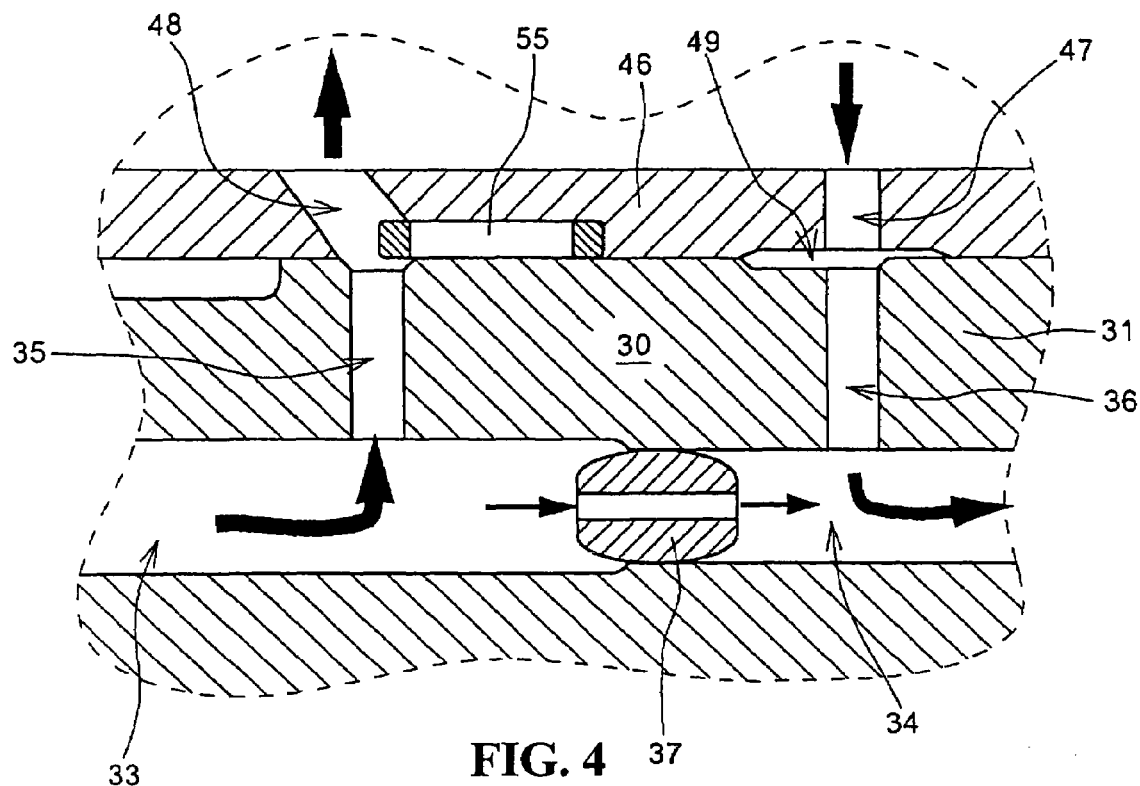
FIG. 4 is an enlarged sectional view of an essential part of the internal combustion engine shown in FIG. 1.

FIG. 3 is a sectional view of the crankshaft 30. FIG. 4 is an enlarged sectional view of an essential part of the shaft portion 31 in connection with the shaft support member 46. The same reference numerals as those shown in FIGS. 1 and 2 denote the same or like parts. The oil introduced from the inlet hole 35 is supplied through a passage 48 formed in the shaft support member 46 into the torque converter 60. After functioning as the hydraulic fluid in the torque converter 60, the oil is discharged from a passage 47 formed in the shaft support member 46 through the outlet hole 36 to the oil gallery 34. Further, an oil pool 49 is defined between the passage 47 and the outlet hole 36 to temporarily store the oil discharged from the torque converter 60, thereby properly maintaining the oil quantity and oil pressure in the torque converter 60.

The present invention is characterized in that the inlet hole 35 is located at an axial end of the shaft bearing 55. With this arrangement, the oil supplied from the inlet hole 35 does not pass through the narrow space between the components of the shaft bearing 55, so that the flow resistance between the inlet hole 35 and the passage 48 can be greatly reduced. Accordingly, even when the temperature of the oil is low and the viscosity of the oil is therefore high, the oil can be supplied smoothly into the torque converter 60, and an oil quantity and oil pressure required for the functioning of the torque converter 60 can be obtained. Further, the inlet hole 35 is located so as to communicate with both the axial end of the shaft bearing 55 and the passage 48, so that the function of the lubricating of the shaft bearing 55 by the oil supplied from the inlet hole 35 can also be ensured.

Figure 5:
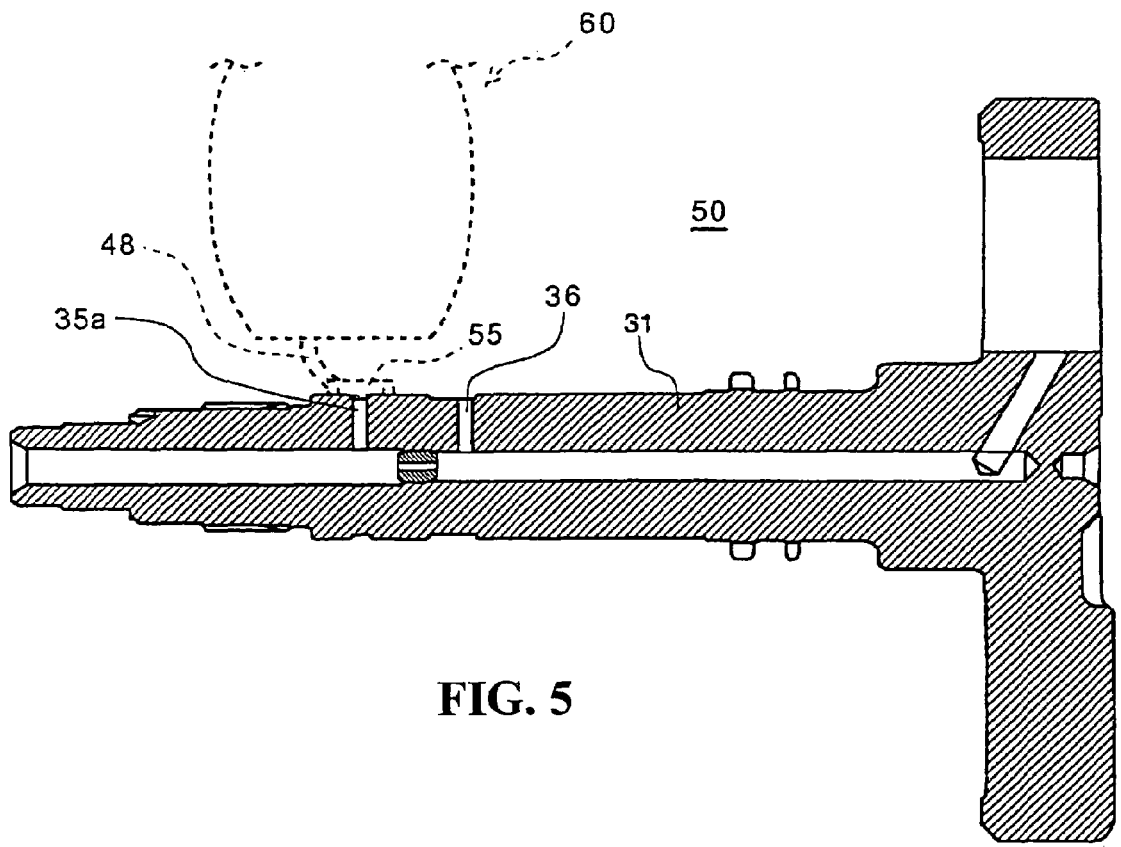
FIG. 5 is a sectional view of a crankshaft in the prior art.

In comparison with the inlet hole 35a in the prior art shown in FIG. 5, the inlet hole 35 in this preferred embodiment is located in the vicinity of the axial center of the rotating shaft for the torque converter 60. In other words, the axial position of the inlet hole 35 is shifted (e.g., by a distance of 7 mm) from the axial center of the shaft bearing 55 toward the oil inlet 33a (see FIG. 2) of the crankshaft 30. The axial position of the inlet hole 35 corresponds to the axial center of the torque converter 60, so that the oil can be supplied more smoothly into the torque converter 60.

According to the present invention, the temperature range of the hydraulic fluid allows the function of the torque converter to be extended towards lower temperatures by a simple change in structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine with a torque converter mounted on a crankshaft, said crankshaft being formed with an oil passage extending along the axis of said crankshaft, an inlet hole for supplying a hydraulic fluid from said oil passage to said torque converter, and an outlet hole for discharging said hydraulic fluid from said torque converter to said oil passage, said crankshaft having an orifice provided in said oil passage, said inlet hole being located upstream of said orifice, said outlet hole being located downstream of said orifice, said crankshaft being provided with a shaft bearing for supporting a rotating shaft for said torque converter,
wherein said inlet hole is located at an axial end of said shaft bearing such that the inlet hole communicates with the axial end of the shaft bearing and the hydraulic fluid also lubricates the shaft bearing,
wherein a first end of the shaft bearing overlaps the inlet hole such that the shaft bearing only partially overlaps the inlet hole,
wherein the shaft bearing is not connected to any outlet holes, and
wherein the inlet hole is only connected to the shaft bearing and an oil supply passage of the torque converter.

2. The internal combustion engine with a torque converter according to claim 1, wherein an axial end of said shaft bearing corresponds to an axial end positioned near said rotating shaft for said torque converter.

3. The internal combustion engine with a torque converter according to claim 2, wherein said inlet hole is located so that at least a part of an opening of said inlet hole exposed to said shaft bearing is not blocked by said shaft bearing.

4. The internal combustion engine with a torque converter according to claim 2, wherein said inlet hole is located in the vicinity of the axial center of said rotating shaft for said torque converter.

5. The internal combustion engine with a torque converter according to claim 1, wherein said inlet hole is located so that at least a part of an opening of said inlet hole exposed to said shaft bearing is not blocked by said shaft bearing.

6. The internal combustion engine with a torque converter according to claim 1, wherein said inlet hole is located in the vicinity of the axial center of said rotating shaft for said torque converter.

7. The internal combustion engine with a torque converter according to claim 1, wherein an edge of the shaft bearing overlaps the inlet hole.

8. An internal combustion engine with a torque converter mounted on a crankshaft comprising:
an oil passage formed in said crankshaft and extending along the axis of said crankshaft;
an inlet hole for supplying hydraulic fluid from said oil passage to said torque converter;
an outlet hole for discharging hydraulic fluid from said torque converter to said oil passage;
an orifice formed in said oil passage, said inlet hole being located upstream of said orifice and said outlet hole being located downstream of said orifice; and
a shaft bearing mounted on said crankshaft for supporting a rotating shaft for said torque converter,
said inlet hole being located adjacent to the shaft bearing and being located at an axial end of said shaft bearing such that the inlet hole communicates with the axial end of the shaft bearing and the hydraulic fluid also lubricates the shaft bearing,
wherein a first end of the shaft bearing overlaps the inlet hole such that the shaft bearing only partially overlaps the inlet hole,
wherein the shaft bearing is not connected to any outlet holes, and
wherein the inlet hole is only connected to the shaft bearing and an oil supply passage of the torque converter.

9. The internal combustion engine with a torque converter according to claim 8, wherein an axial end of said shaft bearing corresponds to an axial end positioned near said rotating shaft for said torque converter.

10. The internal combustion engine with a torque converter according to claim 9, wherein said inlet hole is located so that at least a part of an opening of said inlet hole exposed to said shaft bearing is not blocked by said shaft bearing.

11. The internal combustion engine with a torque converter according to claim 8, wherein said inlet hole is located so that at least a part of an opening of said inlet hole exposed to said shaft bearing is not blocked by said shaft bearing.

12. The internal combustion engine with a torque converter according to claim 8, wherein said inlet hole is located in the vicinity of the axial center of said rotating shaft for said torque converter.

13. The internal combustion engine with a torque converter according to claim 8, wherein an edge of the shaft bearing overlaps the inlet hole.

* * * * *